US012691773B2

(12) United States Patent
Feng et al.

(10) Patent No.: US 12,691,773 B2
(45) Date of Patent: Jul. 28, 2026

(54) ON-BOARD OBC CONTROL CIRCUIT CAPABLE OF BIDIRECTIONALLY CHARGING AND DISCHARGING AND CONTROL METHOD THEREOF

(71) Applicant: SHENZHEN VMAX NEW ENERGY (GROUP) CO.,LTD, Shenzhen (CN)

(72) Inventors: Yingying Feng, Shenzhen (CN); Jinzhu Xu, Shenzhen (CN); Xusheng Li, Shenzhen (CN)

(73) Assignee: SHENZHEN VMAX NEW ENERGY (GROUP) CO., LTD, Shenzhen (CN)

( * ) Notice: Subject to any disclaimer, the term of this patent is extended or adjusted under 35 U.S.C. 154(b) by 0 days.

(21) Appl. No.: 18/796,457

(22) Filed: Aug. 7, 2024

(65) Prior Publication Data
US 2024/0391335 A1      Nov. 28, 2024

Related U.S. Application Data

(63) Continuation of application No. PCT/CN2023/095581, filed on May 22, 2023.

(30) Foreign Application Priority Data

Nov. 29, 2022      (CN) .......................... 202211515983.3

(51) Int. Cl.
B60L 53/22          (2019.01)
H02J 3/32          (2006.01)

(52) U.S. Cl.
CPC .............. B60L 53/22 (2019.02); H02J 3/322 (2020.01); B60L 2210/20 (2013.01)

(58) Field of Classification Search
CPC .................................. B60L 53/22; H02J 3/322
See application file for complete search history.

(56) References Cited

U.S. PATENT DOCUMENTS

| | | | | |
|---|---|---|---|---|
| 10,720,787 | B2 * | 7/2020 | Dohmeier | ............... B60L 53/24 |
| 2013/0194847 | A1 * | 8/2013 | Taddeo | ................... H02M 1/10 |
| | | | | 363/123 |

(Continued)

FOREIGN PATENT DOCUMENTS

| | | |
|---|---|---|
| CN | 106160143 A | 11/2016 |
| CN | 107738589 A | 2/2018 |

(Continued)

OTHER PUBLICATIONS

International Search Report of PCT/CN2023/095581, Sep. 27, 2023.

*Primary Examiner* — Menatoallah Youssef
*Assistant Examiner* — Esayas G Yeshaw
(74) *Attorney, Agent, or Firm* — Troutman Pepper Locke LLP; Tim Tingkang Xia, Esq.

(57)          ABSTRACT

The present invention discloses an on-board OBC control circuit capable of bidirectionally charging and discharging and a control method thereof. The OBC control circuit includes a switch module that connects an out-vehicle electric circuit and an in-vehicle electric circuit, and a bidirectional on-board OBC that operates in a charge mode, in a contravariant mode and in the AC/AC mode. In the charge mode, the out-vehicle electric circuit charges the bidirectional on-board OBC through the switch module; in the contravariant mode, the bidirectional on-board OBC discharges the out-vehicle electric circuit and/or the in-vehicle electric circuit through the switch module; in the AC/AC mode, the out-vehicle electric circuit connects the in-vehicle electric circuit through the switch module. When the OBC is in an in-vehicle discharge mode, the relay connected to the out-vehicle L-wire is kept break-contact, and the charging port of the vehicle is completely disconnected from the circuit.

10 Claims, 6 Drawing Sheets

(56) References Cited

U.S. PATENT DOCUMENTS

| | | | | |
|---|---|---|---|---|
| 2017/0085106 A1* | 3/2017 | Bai | .................. | H02M 3/33584 |
| 2020/0086755 A1* | 3/2020 | Maruyama | ............. | B60L 53/60 |
| 2022/0089049 A1* | 3/2022 | Ando | ............... | H02M 3/33573 |
| 2022/0209543 A1* | 6/2022 | Lee | ......................... | B60L 53/22 |

FOREIGN PATENT DOCUMENTS

| | | | |
|---|---|---|---|
| CN | 108202642 | A | 6/2018 |
| CN | 108454440 | A | 8/2018 |
| CN | 110614930 | A | 12/2019 |
| CN | 115091955 | A | 9/2022 |
| CN | 116080435 | A | 5/2023 |
| WO | 2022011660 | A1 | 1/2022 |

* cited by examiner out-vehicle
electric circuit in-vehicle
electric circuit

ON-BOARD OBC CONTROL CIRCUIT CAPABLE OF BIDIRECTIONALLY CHARGING AND DISCHARGING AND CONTROL METHOD THEREOF

CROSS-REFERENCE TO RELATED PATENT APPLICATION

This application is a continuation application of International Patent Application No. PCT/CN2023/095581, filed on May 22, 2023, which itself claims priority to Chinese Patent Application No. CN202211515983.3 filed in China on Nov. 29, 2022. The disclosures of the above applications are incorporated herein in their entireties by reference.

FIELD OF THE INVENTION

The present invention relates to the technical field of on-board power-source circuits, in particular to an on-board OBC control circuit capable of bidirectionally charging and discharging and a control method thereof.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A way of controlling relays to make contact or break contact enables an existing bidirectional on-board charger (OBC) to charge or discharge, and a Hall sensor is used to measure circuit currents. When the bidirectional OBC is in a charge mode, alternating currents are connected to the OBC from a charging port to charge a battery; when the OBC is in a contravariant mode, a vehicle battery outputs voltages to a vehicle charging port or an in-vehicle interface through a discharge device to supply power to relevant load equipment. However, the existing way of controlling OBC to charge or discharge through relays has the defect of resulting in a large number of relays and a large rated capacity.

Therefore, how to design an on-board OBC control circuit capable of bidirectionally charging and discharging, which has a small number of relays and a relatively-small rated capacity, is a technical problem that needs to be solved urgently in this technical field.

SUMMARY OF THE INVENTION

In order to solve the above-mentioned defect existing in the prior art, the present invention provides an on-board OBC control circuit capable of bidirectionally charging and discharging and a control method thereof.

The technical solutions adopted in this present invention is to design an on-board OBC control circuit capable of bidirectionally charging and discharging, comprising a switch module that connects an out-vehicle electric circuit and an in-vehicle electric circuit, and a bidirectional on-board OBC that operates in a charge mode, in a contravariant mode and in the AC/AC mode; wherein in the charge mode, the out-vehicle electric circuit charges the bidirectional on-board OBC through the switch module; in the contravariant mode, the bidirectional on-board OBC discharges the out-vehicle electric circuit and/or the in-vehicle electric circuit through the switch module; in the AC/AC mode, the out-vehicle electric circuit connects the in-vehicle electric circuit through the switch module.

In one technical solutions, the switch module comprises a current-limiting resistor R, a first switch K1, a second switch K2 and a third switch K3, the current-limiting resistor R and the third switch K3 are connected with each other in series, then connected with the first switch K1 in parallel to form a unit, which is connected between a power line L1 of the out-vehicle electric circuit and a first end O1 of the bidirectional on-board OBC; the second switch K2 is connected between a power line L2 of the in-vehicle electric circuit and the first end O1 of the bidirectional on-board OBC; a zero line N1 of the out-vehicle electric circuit and a zero line N2 of the in-vehicle electric circuit are connected with each other in parallel, then connected to a second end O2 of the bidirectional on-board OBC.

The first switch K1, the second switch K2, and the third switch K3 all adopt a single-pole single-throw relay.

A rated capacity of the second switch K2 is 20% to 80% of a rated capacity of the first switch K1, and a rated capacity of the third switch K3 is 20% to 80% of a rated capacity of the first switch K1.

In another technical solutions, the switch module comprises a current-limiting resistor R, a fourth switch K4 and a fifth switch K5, the fourth switch K4 is connected between a power line L1 of the out-vehicle electric circuit and a first end O1 of the bidirectional on-board OBC; the fifth switch K5 comprises a mobile break-contact head, a mobile make-contact head and a static contact head, the mobile break-contact head is connected in series with the current-limiting resistor R, then connected to the power line L1 of the out-vehicle electric circuit, the mobile make-contact head is connected to a power line L2 of the in-vehicle electric circuit, the static contact head is connected to the first end O1 of the bidirectional on-board OBC; a zero line N1 of the out-vehicle electric circuit and a zero line N2 of the in-vehicle electric circuit are connected with each other in parallel, then connected to a second end O2 of the bidirectional on-board OBC.

The fourth switch K4 adopts a single-pole single-throw relay, but the fifth switch K5 adopts a single-pole double-throw relay.

A rated capacity of the fifth switch K5 is 20% to 80% of a rated capacity of the fourth switch K4.

The present invention further provides a method for controlling an on-board OBC control circuit capable of bidirectionally charging and discharging, comprising: using the on-board OBC control circuit capable of bidirectionally charging and discharging, which operates in a charge mode, in a contravariant mode and in the AC/AC mode; and controlling the control switch module to correspondingly act according to a selected mode, so as to form a route for electricity transmission; wherein in the charge mode, the out-vehicle electric circuit charges the bidirectional on-board OBC through the switch module; in the contravariant mode, the bidirectional on-board OBC discharges the out-vehicle electric circuit and/or the in-vehicle electric circuit through the switch module; in the AC/AC mode, the out-vehicle electric circuit connects the in-vehicle electric circuit through the switch module.

When the switch module comprises a current-limiting resistor R, a first switch K1, a second switch K2 and a third switch K3; in the charging mode, the first switch K1 makes contact, and the second switch K2 breaks contact; in the contravariant mode, the first switch K1 makes contact at the time of discharging to the out-vehicle electric circuit, the second switch K2 makes contact at the time of discharging to the in-vehicle electric circuit; the first switch K1 and the second switch K2 make contact at the time of concurrently discharging to the out-vehicle electric circuit and the in-vehicle electric circuit; in the AC/AC mode, the first switch K1 and the second switch K2 make contact.

When the switch module comprises a current-limiting resistor R, a fourth switch K4 and a fifth switch K5; in the charging mode, the fourth switch K4 makes contact; in the contravariant mode, the fourth switch K4 makes contact at the time of discharging to the out-vehicle electric circuit, a mobile make-contact head and a static contact head of the fifth switch K5 make contact at the time of discharging to the in-vehicle electric circuit; the fourth switch K4 makes contact, and the mobile make-contact head and static contact head of the fifth switch K5 make contact at the time of concurrently discharging to the out-vehicle electric circuit and the in-vehicle electric circuit; in the AC/AC mode, the fourth switch K4 makes contact, and the mobile make-contact head and static contact head of the fifth switch K5 make contact.

The technical solution provided by the present invention has the following beneficial effects.

1. When the OBC is in a charge mode, it is necessary to perform soft power-up, and the alternating current is connected to the OBC after passing through resistors, thus an impact is buffered on the OBC device; this way can effectively prevent the OBC circuit from getting impacted and causing damage at the moment of connecting the alternating current.

2. When the OBC is in an in-vehicle discharge mode, the relay connected to the out-vehicle L-wire is kept break-contact, and the charging port of the vehicle is completely disconnected from the circuit; this way can ensure that no electric shock will occur when a human body is in contact with the charging port, raising a level of security blankets.

3. The number of relays decreases, the rated capacity lowers, effectively lessening device volumes and reducing costs.

BRIEF DESCRIPTION OF THE DRAWINGS

We shall describe the present invention in detail in combination with the examples and drawings as follows, where.

DETAILED DESCRIPTION OF SOME EMBODIMENTS

In order to make the objectives, technical solutions, and advantages of the invention clearer, the invention is further described in detail with reference to the drawings and the embodiments as follows. It should be understood that the specific embodiments described here are only used to explain the invention, but not used to limit the invention.

The present invention discloses an on-board OBC control circuit capable of bidirectionally charging and discharging, including a switch module that connects an out-vehicle electric circuit and an in-vehicle electric circuit, and a bidirectional on-board OBC that operates in a charge mode, in a contravariant mode and in the AC/AC mode. In the charge mode, the out-vehicle electric circuit charges the bidirectional on-board OBC through the switch module; in the contravariant mode, the bidirectional on-board OBC discharges the out-vehicle electric circuit and/or the in-vehicle electric circuit through the switch module; in the AC/AC mode, the out-vehicle electric circuit connects the in-vehicle electric circuit through the switch module.

Figure 1:
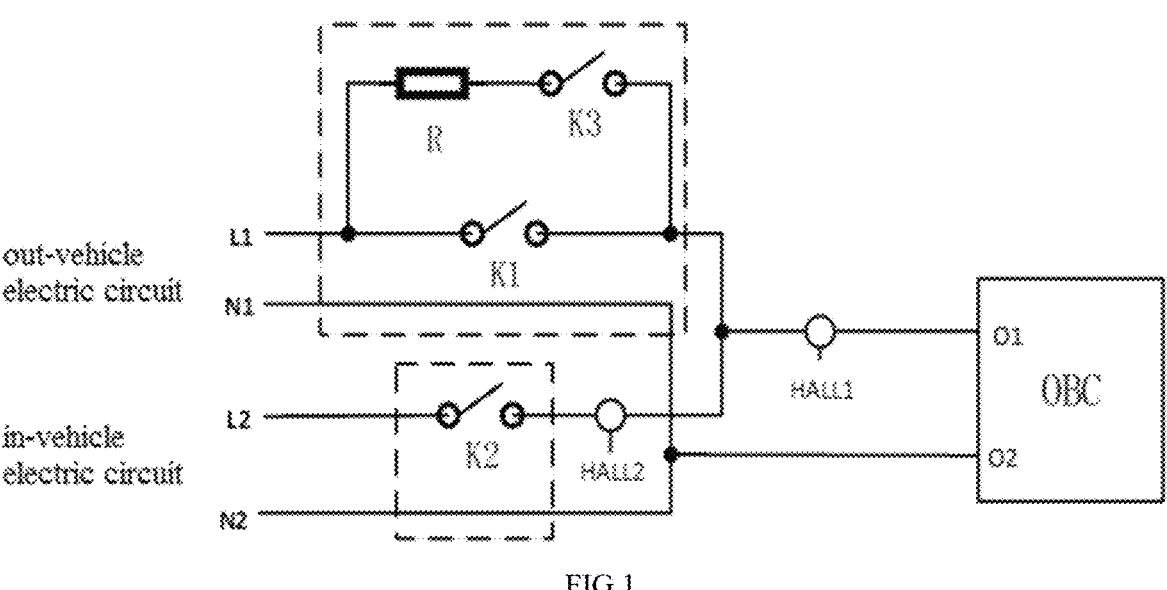
FIG. 1 is a circuit diagram of the first example of the present invention.

FIG. 1 has shown a circuit diagram of the first example of the present invention. The switch module includes a current-limiting resistor R, a first switch K1, a second switch K2 and a third switch K3, wherein the current-limiting resistor R and the third switch K3 are connected with each other in series, then connected with the first switch K1 in parallel to form a unit, which is connected between the power line L1 of the out-vehicle electric circuit and the first end O1 of the bidirectional on-board OBC; the second switch K2 is connected between the power line L2 of the in-vehicle electric circuit and the first end O1 of the bidirectional on-board OBC; the zero line N1 of the out-vehicle electric circuit and the zero line N2 of the in-vehicle electric circuit are connected with each other in parallel, then connected to the second end O2 of the bidirectional on-board OBC.

In the first example, the first switch K1, the second switch K2, and the third switch K3 all adopt a single-pole single-throw relay.

In the first example, the rated capacity of the second switch K2 is 20% to 80% of the rated capacity of the first switch K1, and the rated capacity of the third switch K3 is 20% to 80% of the rated capacity of the first switch K1. This design can not only decrease the number of relays, lower the rated capacity of relays, effectively lessen device volumes and reduce costs, but also meet the functional requirements of the circuit. The rated current that the rated capacity of relays allows to flow through relays and switch contacts is called touch-point capacity, also contact capacity.

A current sensor is arranged in a main circuit of the bidirectional on-board OBC, and the controller in the bidirectional on-board OBC provides overcurrent protection for the circuit according to the current value measured by the current sensor. Referring to the example shown in FIG. 1, a first Hall sensor HALL1 is installed on a connection line of the first end O1, and a second Hall sensor HALL2 is installed on a connection line of the second switch K2.

Figure 2:
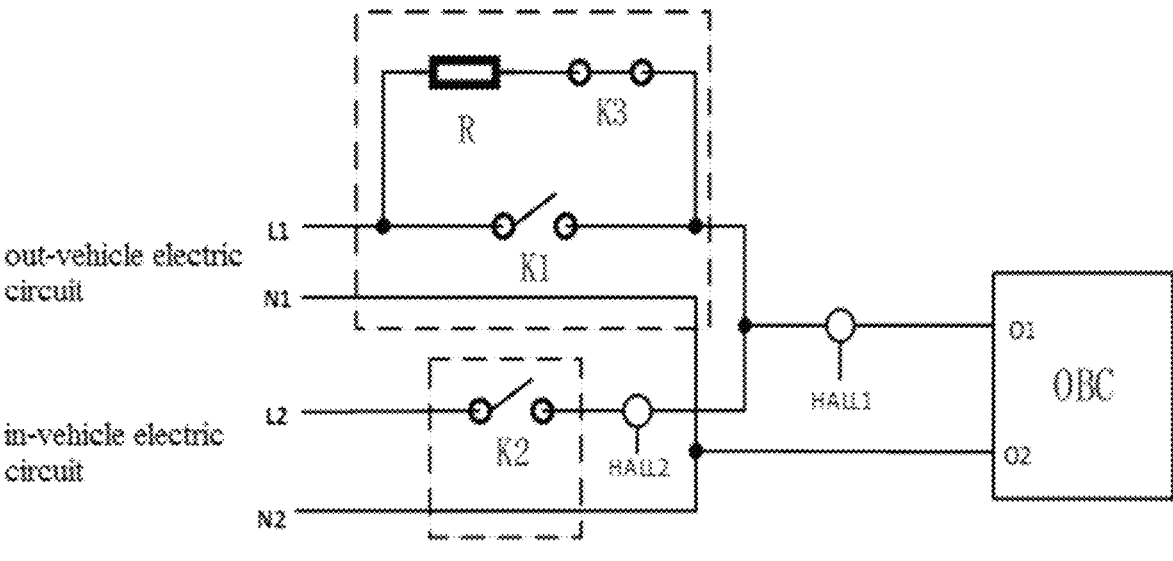
FIG. 2 is a diagram showing soft power-up in the first example.

FIG. 2 shows operation of soft power-up in the first example. When an OBC circuit starts, on soft power-up, the third switch K3 makes contact and the first switch K1 and the second switch K2 break contact, so that the alternating current is connected to the OBC after passing through the

Figure 3:
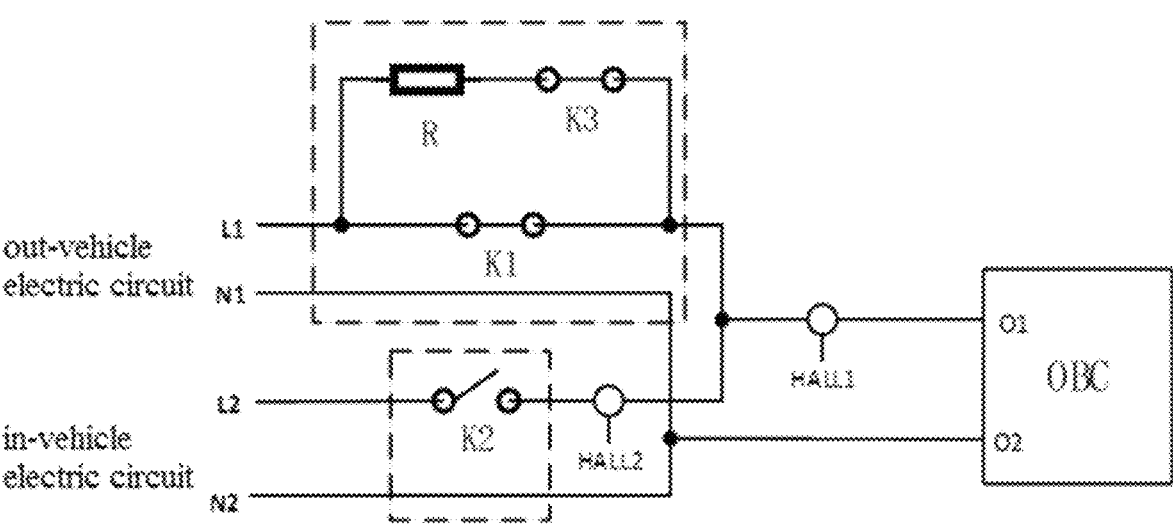
FIG. 3 is a diagram showing operation of charging in the first example.

5 current limiting resistor R, so as to avoid damage to components caused by suddenly applying a large voltage on the OBC circuit. After ending soft power-up, the first switch K1 make contact, the current limiting resistor R has a short circuit, and the alternating current directly is connected to the OBC through the first switch K1, and the circuit only operates in the charge mode at this time; its operation circuit is shown in FIG. 3.

Figure 4:
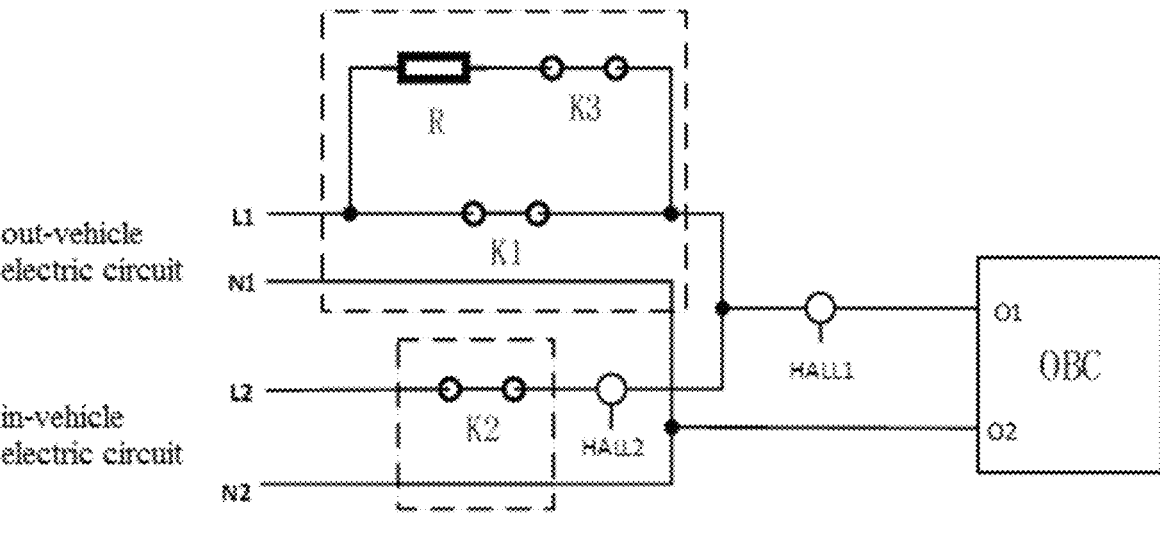
FIG. 4 is a diagram showing operation of not only charging but also discharging inside a vehicle in the first example.

When the OBC operates in a mode of not only charging but also discharging inside a vehicle, its operation circuit is shown in FIG. 4; the first switch K1, the second switch K2 and the third switch K3 all make contact, a contact made on the first switch K1 connects a vehicle charging port to the OBC, a contact made on the second switch K2 connects an in-vehicle port to the OBC; the 220V alternating current is divided into two routes, one is connected to the OBC to realize the charging function, and the other is connected to the in-vehicle port to realize the discharging function inside the vehicle.

Figure 5:
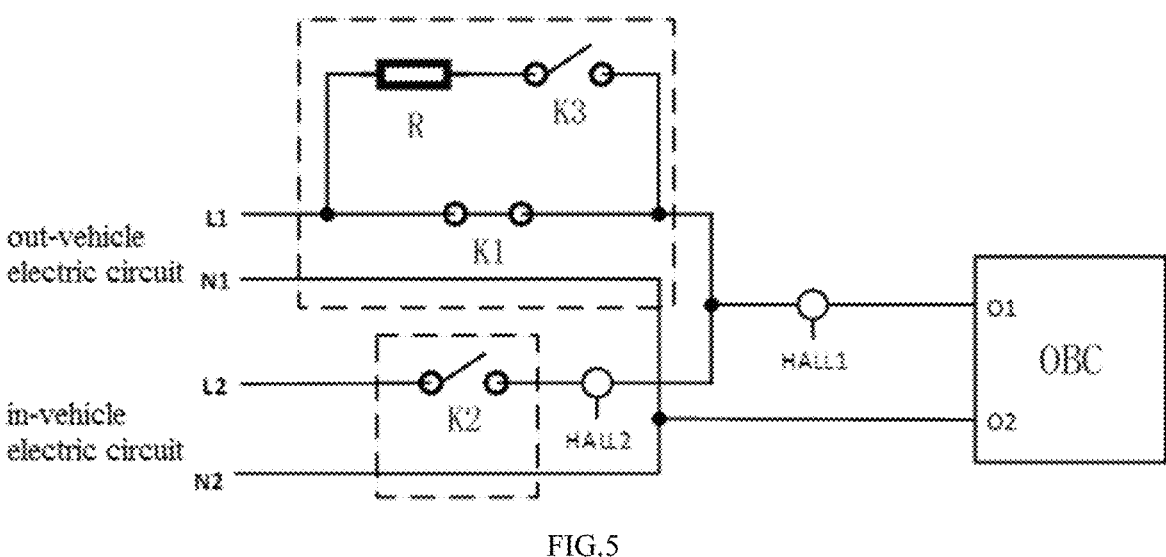
FIG. 5 is a diagram showing operation of only discharging outside a vehicle in the first example.
Figure 6:
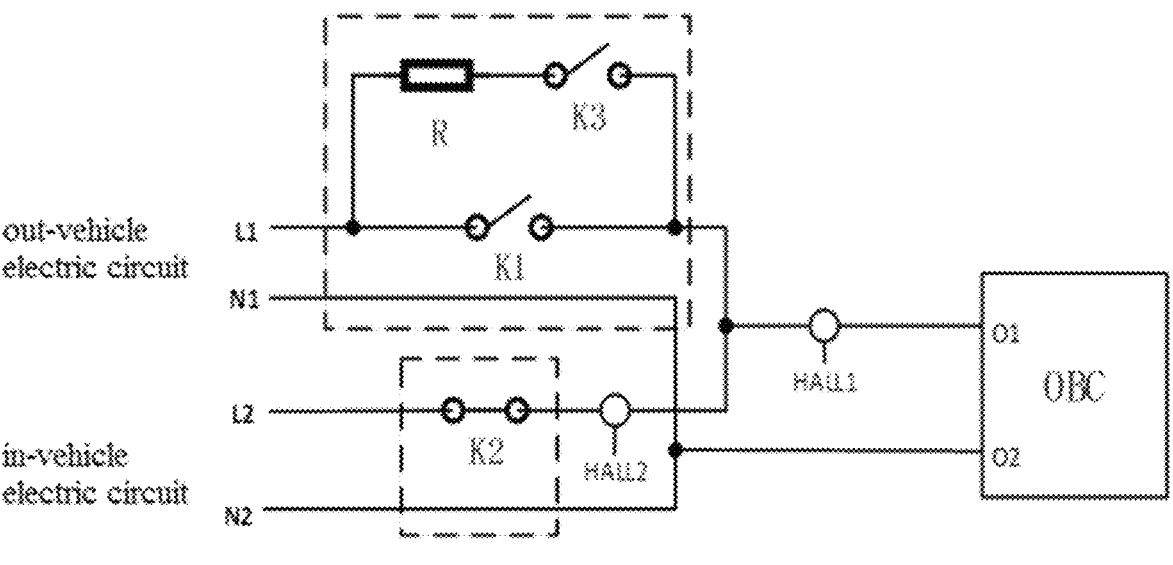
FIG. 6 is a diagram showing operation of only discharging inside a vehicle in the first example.
Figure 7:
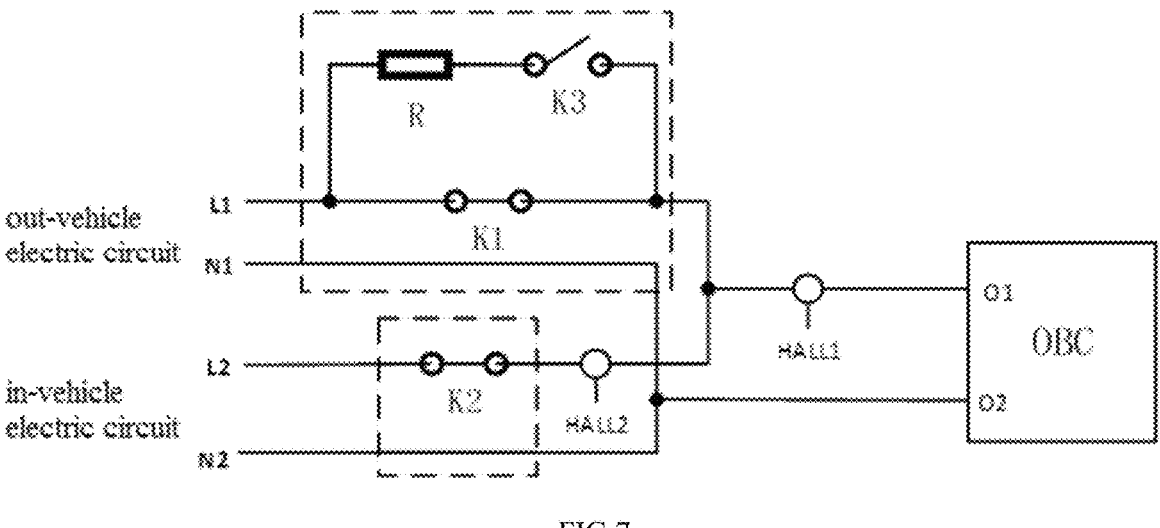
FIG. 7 is a diagram showing operation of concurrently discharging inside and outside a vehicle in the first example.

The discharge mode in which the OBC operates may include a state of only discharging outside a vehicle, a state of only discharging inside a vehicle and a state of concurrently discharging inside and outside a vehicle; in the process of discharging, the discharge mode of the OBC is controlled by the first switch K1 and the second switch K2, and the third switch K3 is in a break-contact state to prevent the resistor from being burned out during discharging. The operation circuit of only discharging outside a vehicle is shown in FIG. 5, the first switch K1 makes contact, the second switch K2 and the third switch K3 break contact, and the 220V voltage is output to the charging port by the OBC, and the in-vehicle port is disconnected from the circuit. The operation circuit of only discharging inside a vehicle is shown in FIG. 6, the second switch K2 makes contact, the first switch K1 and the third switch K3 break contact, the OBC outputs the voltage to the in-vehicle port, and the first switch K1 and the third switch K3 are concurrently disconnected to ensure that the vehicle charging ports are not in live operation, improving safety performance. The operation circuit of concurrently discharging inside and outside a vehicle is shown in FIG. 7, the first switch K1 and the second switch K2 make contact, the third switch K3 breaks contact, and the OBC outputs the voltage to the charging port and the in-vehicle port, so as to realize the function of concurrently discharging inside and outside a vehicle.

In the first example, the following table 1 indicates that the in-vehicle port and the out-of-vehicle port of the OBC are in a live state, Mark 1 represents a make-contact state of the relays and Mark 0 represents a break-contact of the relay; when the OBC is in the charge mode, the third switch K3 remains make-contact, and when it is in the contravariant mode, it remains break-contact; the OBC does not operate in the AC/AC mode, and all the vehicle ports are not in live state.

6

Note: In the charge mode, the out-vehicle electric circuit is always live; in the contravariant mode, the first end O1 and the second end O2 of the OBC are always live; in the AC/AC mode, the out-vehicle electric circuit is always live.

Figure 8:
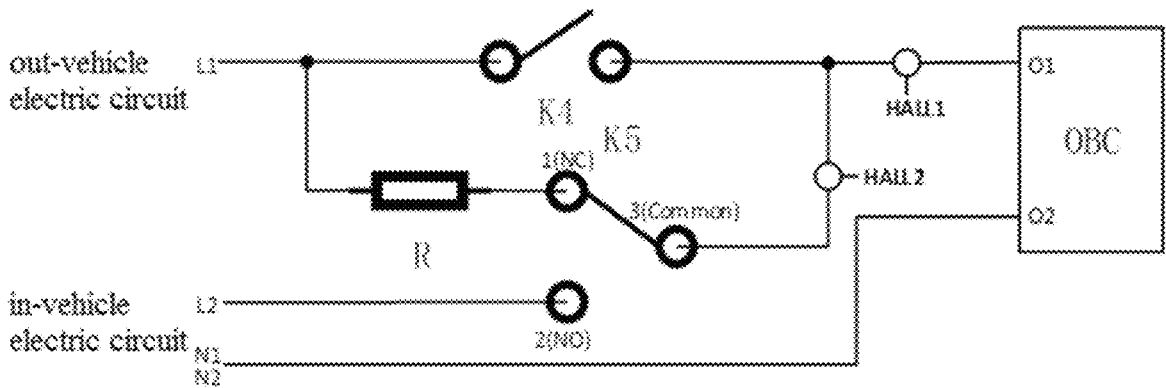
FIG. 8 is a circuit diagram of the second example of the present invention.

Referring to the second example shown in FIG. 8, the switch module includes a current-limiting resistor R, a fourth switch K4 and a fifth switch K5; wherein the fourth switch K4 is connected between the power line L1 of the out-vehicle electric circuit and the first end O1 of the bidirectional on-board OBC; the fifth switch K5 includes a mobile break-contact head (NC end), a mobile make-contact head (NO end) and a static contact head (Common end); when the coil of the fifth switch K5 is not electrified, the Common end is connected with the NC end by default to realize the function of charging or discharging outside a vehicle; after the coil has been electrified, the Common end is connected with the NO end to realize the function of discharging inside a vehicle. The mobile break-contact head is connected in series with the current-limiting resistor R, then connected to the power line L1 of the out-vehicle electric circuit; the mobile make-contact head is connected to the power line L2 of the in-vehicle electric circuit; the static contact head is connected to the first end O1 of the bidirectional on-board OBC; the zero line N1 of the out-vehicle electric circuit and the zero line N2 of the in-vehicle electric circuit are connected with each other in parallel, then connected to the second end O2 of the bidirectional on-board OBC.

In the second example, the fourth switch K4 adopts a single-pole single-throw relay, but the fifth switch K5 adopts a single-pole double-throw relay.

In the second example, the rated capacity of the fifth switch K5 is 20% to 80% of the rated capacity of the fourth switch K4. This design can not only decrease the number of relays, lower the rated capacity of relays, effectively lessen device volumes and reduce costs, but also meet the functional requirements of the circuit.

In the second example, a first Hall sensor HALL1 is installed on a connection line of the first end O1, and a second Hall sensor HALL2 is installed on a connection line of the static contact head. The Hall sensors detect current values in the circuit and transmit data to a controller, providing overcurrent protection for the circuit.

Figure 9:
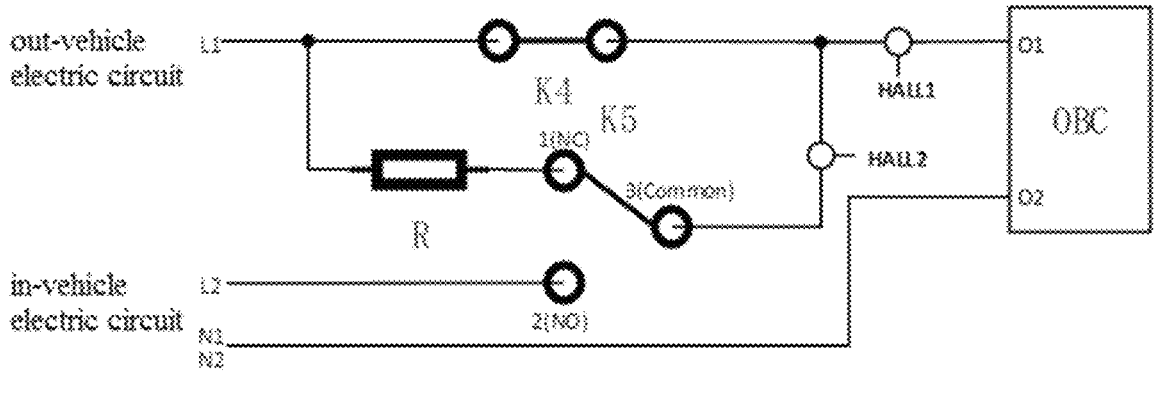
FIG. 9 is a diagram showing operation of charging in the second example.

When the OBC is in the charging mode, its operation circuit is shown in FIG. 9; the Common end of the fifth switch K5 is connected with the NC end to connect the current-limiting resistor R to the OBC circuit; the alternating current flows into the OBC through the current-limiting resistor R for soft power-up; after soft power-up, the fourth switch K4 makes contact, thus the alternating current is connected to the OBC from the vehicle charging port, so as to charge a vehicle battery.

When the OBC operates in a mode of not only charging but also discharging inside a vehicle, its operation circuit is

TABLE 1

Figure 11:
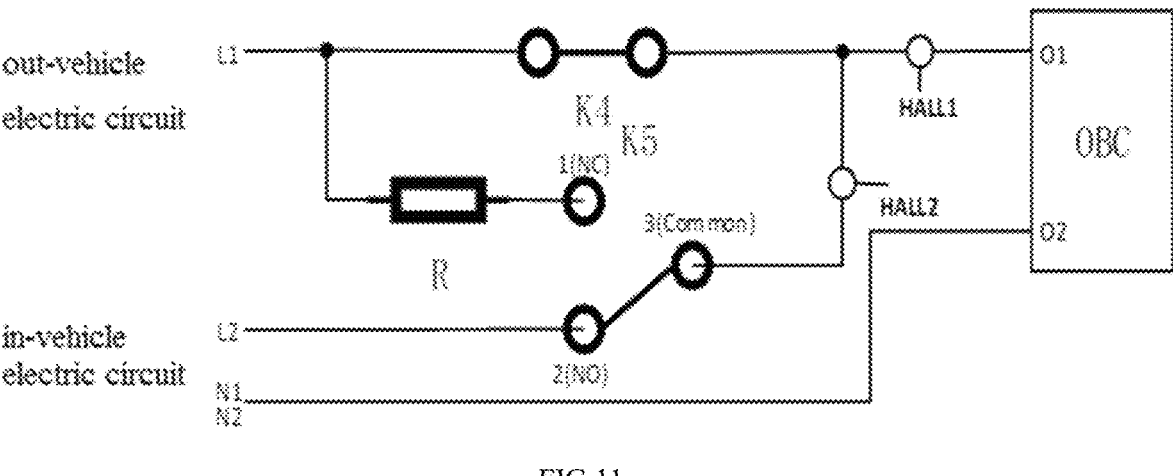
FIG. 11 is a diagram showing operation of not only charging but also discharging inside a vehicle in the second example.

| | charge mode(K3 = 1) | | contravariant mode(K3 = 0) | | AC/AC mode | |
|---|---|---|---|---|---|---|
| | | | live state | | | |
| (K1, K2) | out-vehicle port | in-vehicle port | out-vehicle port | In-vehicle port | out-vehicle port | in-vehicle port |
| (0, 0) | live | not live | not live | not live | live | live |
| (0, 1) | live | live | not live | live | live | live |
| (1, 0) | live | not live | live | not live | live | live |
| (1, 1) | live | live | live | live | live | not live | shown in FIG. 11; the fourth switch K4 makes contact, and the Common end of the fifth switch K5 is switched to be connected with the NO end, so as to connect the OBC to the in-vehicle port, at this moment the alternating current is connected to the OBC through the fourth switch K4, and then is connected to the in-vehicle port through the fifth switch K5, realizing the function of discharging inside a vehicle.

Figure 10:
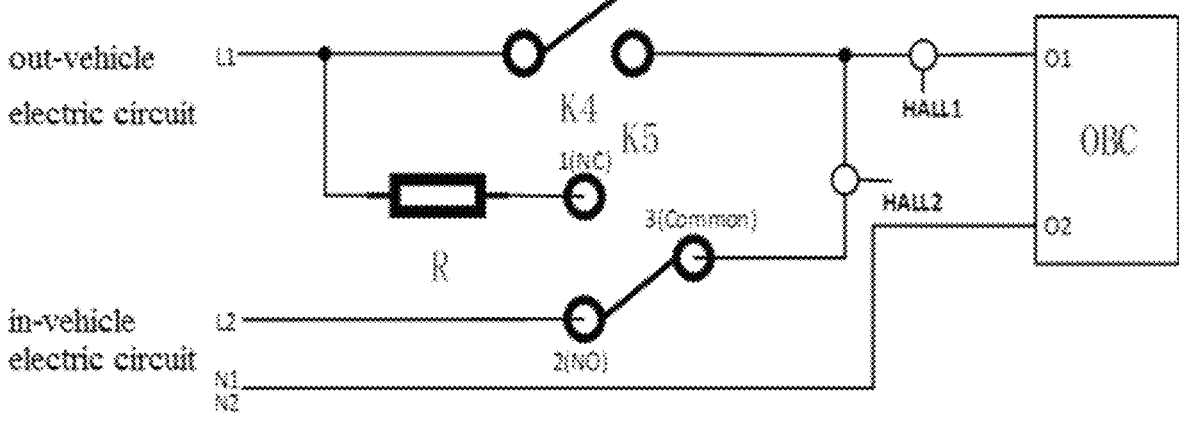
FIG. 10 is a diagram showing operation of discharging inside a vehicle in the second example.

When the OBC is in the contravariant mode, it is achievable to control the discharge function by way of controlling the Common end of the fifth switch K5 to make and break contact with the NC end and the NO end. When the OBC only discharges outside a vehicle, its operation circuit diagram is consistent with FIG. 9; the fourth switch K4 firstly makes contact and then starts the contravariant mode of OBC, a contact made on the fourth switch K4 makes a short circuit between the current limiting resistor R and the fifth switch K5, and the OBC transmits a battery voltage to the vehicle charging port to realize the function of discharging outside a vehicle. When the OBC only discharges inside a vehicle, its operation circuit diagram is shown in FIG. 10; the fourth switch K4 breaks contact, the Common end of the fifth switch K5 is connected with the NO end, and the OBC transmits a battery voltage to the in-vehicle port, so as to realize the function of discharging inside a vehicle, at this moment the vehicle charging port is completely disconnected from the OBC, improving safety somewhat. When the OBC concurrently discharges inside and outside a vehicle, its operation circuit diagram is shown in FIG. 11; the fourth switch K4 makes contact, the Common end of the fifth switch K5 is connected with the NO end, the vehicle charging port and the in-vehicle port are concurrently connected with the OBC, thus a battery voltage is transmitted to the vehicle charging port and the in-vehicle port after starting of the OBC, realizing the function of concurrently discharging inside and outside a vehicle.

In the second example, the following table 2 indicates that the in-vehicle port and the out-of-vehicle port of the OBC are in a live state, Mark 1 or Mark 0 represents a make-contact or break-contact state of the fourth switch K4; NC represents a connection between the Common end of the fifth switch K5 and the NC end, and NO represents a connection between the Common end of the fifth switch K5 and the NO end; in the charging mode, the fourth switch K4 breaks contact, and the Common end of the fifth switch K5 is connected with the NC end, thus the out-vehicle port is live; in the contravariant mode, the fourth switch K4 breaks contact, and the connection of the Common end of the fifth switch K5 to the NC end is switched to a connection to the NO end after electrification, so as to realize the function of discharging inside a vehicle.

and the second end O2 of the OBC are always live; in the AC/AC mode, the out-vehicle electric circuit is always live.

The present invention further discloses a method for controlling an on-board OBC control circuit capable of bidirectionally charging and discharging, including using the above-mentioned on-board OBC control circuit capable of bidirectionally charging and discharging, which operates in a charge mode, in a contravariant mode and in the AC/AC mode, and controlling the control switch module to correspondingly act according to a selected mode, so as to form a route for electricity transmission; wherein in the charge mode, the out-vehicle electric circuit charges the bidirectional on-board OBC through the switch module; in the contravariant mode, the bidirectional on-board OBC discharges the out-vehicle electric circuit and/or the in-vehicle electric circuit through the switch module; in the AC/AC mode, the out-vehicle electric circuit connects the in-vehicle electric circuit through the switch module.

In the first example, the switch module includes a current-limiting resistor R, a first switch K1, a second switch K2 and a third switch K3; in the charging mode, the first switch K1 makes contact, and the second switch K2 breaks contact (as shown in FIG. 3); in the contravariant mode, the first switch K1 makes contact (as shown in FIG. 5) at the time of discharging to the out-vehicle electric circuit, the second switch K2 makes contact (as shown in FIG. 6) at the time of discharging to the in-vehicle electric circuit; the first switch K1 and the second switch K2 make contact at the time of concurrently discharging to the out-vehicle electric circuit and the in-vehicle electric circuit (as shown in FIG. 7); in the AC/AC mode, the first switch K1 and the second switch K2 make contact (as shown in FIG. 4).

It should be pointed out that there will be a soft power-up phase (as shown in FIG. 2) in the early stage of the charging mode, in which the first switch K1 firstly breaks contact, then the third switch K3 makes contact; the current-limiting resistor R is connected with the charging circuit in series, and the OBC is softly powered up under the action of limiting current. After ending the soft power-up phase, the first switch K1 makes contact and a short circuit is made between the current limiting resistor R connected in series and the third switch K3, thus the third switch K3 can either make contact or break contact.

In the second example, the switch module includes a current-limiting resistor R, a fourth switch K4 and a fifth switch K5; in the charging mode, the fourth switch K4 makes contact (as shown in FIG. 9), in the contravariant mode, the fourth switch K4 makes contact at the time of discharging to the out-vehicle electric circuit, the mobile make-contact head and the static contact head of the fifth switch K5 make contact (as shown in FIG. 10) at the time

TABLE 2

| (K4, K5) | live state | | | | | |
| | charge mode | | contravariant mode | | AC/AC mode | |
| | out-vehicle port | in-vehicle port | out-vehicle port | In-vehicle port | out-vehicle port | in-vehicle port |
|---|---|---|---|---|---|---|
| (0, NC) | live | not live | live | not live | live | not live |
| (0, NO) | live | not live | not live | live | live | not live |
| (1, NC) | live | not live | live | not live | live | not live |
| (1, NO) | live | live | live | live | live | live |

Note: In the charge mode, the out-vehicle electric circuit is always live; in the contravariant mode, the first end O1 of discharging to the in-vehicle electric circuit; the fourth switch K4 makes contact, and the mobile make-contact head and static contact head of the fifth switch K5 make contact (as shown in FIG. 11) at the time of concurrently discharging to the out-vehicle electric circuit and the in-vehicle electric circuit; in the AC/AC mode, the fourth switch K4 makes contact and the mobile make-contact head, and the static contact head of the fifth switch K5 make contact (as shown in FIG. 11).

It should be pointed out that there will be a soft power-up phase (as shown in FIG. 8) in the early stage of the charging mode, in which the fourth switch K4 firstly breaks contact, then the mobile make-contact head and the static contact head of the fifth switch K5 make contact; the current-limiting resistor R is connected with the charging circuit in series, and the OBC is softly powered up under the action of limiting current. After ending the soft power-up phase, the fourth switch K4 makes contact and a short circuit is made between the current limiting resistor R connected in series and the mobile make-contact head and static contact head of the fifth switch K5, thus the mobile make-contact head and the static contact head of the fifth switch K5 can either make contact or break contact.

The above content only acts as a better embodiment of the present invention, not used to pose any limitation on the present invention, and any modifications, equivalent substitutions, improvements and the likes made within the essence and principle of the present invention will fall within the protection scope of the present invention.

What is claimed is:

1. An on-board OBC control circuit capable of bidirectionally charging and discharging, comprising a switch module that connects an out-vehicle electric circuit and an in-vehicle electric circuit, and a bidirectional on-board OBC that operates in a charge mode, in a contravariant mode and in an AC/AC mode;

wherein in the charge mode, the out-vehicle electric circuit charges the bidirectional on-board OBC through the switch module;

in the contravariant mode, the bidirectional on-board OBC discharges the out-vehicle electric circuit and/or the in-vehicle electric circuit through the switch module;

in the AC/AC mode, the out-vehicle electric circuit connects the in-vehicle electric circuit through the switch module;

wherein the switch module comprises a current-limiting resistor R, a first switch K1, a second switch K2 and a third switch K3, the current-limiting resistor R and the third switch K3 are connected with each other in series, then connected with the first switch K1 in parallel to form a unit, which is connected between a power line L1 of the out-vehicle electric circuit and a first end O1 of the bidirectional on-board OBC; the second switch K2 is connected between a power line L2 of the in-vehicle electric circuit and the first end O1 of the bidirectional on-board OBC; a zero line N1 of the out-vehicle electric circuit and a zero line N2 of the in-vehicle electric circuit are connected with each other in parallel, then connected to a second end O2 of the bidirectional on-board OBC.

2. The on-board OBC control circuit capable of bidirectionally charging and discharging according to claim 1, wherein the first switch K1, the second switch K2, and the third switch K3 all adopt a single-pole single-throw relay.

3. The on-board OBC control circuit capable of bidirectionally charging and discharging according to claim 2, wherein a rated capacity of the second switch K2 is 20% to 80% of a rated capacity of the first switch K1, and a rated capacity of the third switch K3 is 20% to 80% of a rated capacity of the first switch K1.

4. An on-board OBC control circuit capable of bidirectionally charging and discharging, comprising a switch module that connects an out-vehicle electric circuit and an in-vehicle electric circuit, and a bidirectional on-board OBC that operates in a charge mode, in a contravariant mode and in an AC/AC mode;

wherein in the charge mode, the out-vehicle electric circuit charges the bidirectional on-board OBC through the switch module;

in the contravariant mode, the bidirectional on-board OBC discharges the out-vehicle electric circuit and/or the in-vehicle electric circuit through the switch module;

in the AC/AC mode, the out-vehicle electric circuit connects the in-vehicle electric circuit through the switch module;

wherein the switch module comprises a current-limiting resistor R, a fourth switch K4 and a fifth switch K5, the fourth switch K4 is connected between a power line L1 of the out-vehicle electric circuit and a first end O1 of the bidirectional on-board OBC; the fifth switch K5 comprises a mobile break-contact head, a mobile make-contact head and a static contact head, the mobile break-contact head is connected in series with the current-limiting resistor R, then connected to the power line L1 of the out-vehicle electric circuit, the mobile make-contact head is connected to a power line L2 of the in-vehicle electric circuit, the static contact head is connected to the first end O1 of the bidirectional on-board OBC; a zero line N1 of the out-vehicle electric circuit and a zero line N2 of the in-vehicle electric circuit are connected with each other in parallel, then connected to a second end O2 of the bidirectional on-board OBC.

5. The on-board OBC control circuit capable of bidirectionally charging and discharging according to claim 4, wherein the fourth switch K4 adopts a single-pole single-throw relay, but the fifth switch K5 adopts a single-pole double-throw relay.

6. The on-board OBC control circuit capable of bidirectionally charging and discharging according to claim 4, wherein a rated capacity of the fifth switch K5 is 20% to 80% of a rated capacity of the fourth switch K4.

7. A method for controlling an on-board OBC control circuit capable of bidirectionally charging and discharging, comprising: using the on-board OBC control circuit capable of bidirectionally charging and discharging according to claim 4, which operates in a charge mode, in a contravariant mode and in the AC/AC mode; and controlling the control switch module to correspondingly act according to a selected mode, so as to form a route for electricity transmission; wherein in the charge mode, the out-vehicle electric circuit charges the bidirectional on-board OBC through the switch module; in the contravariant mode, the bidirectional on-board OBC discharges the out-vehicle electric circuit and/or the in-vehicle electric circuit through the switch module; in the AC/AC mode, the out-vehicle electric circuit connects the in-vehicle electric circuit through the switch module.

8. The method for controlling an on-board OBC control circuit capable of bidirectionally charging and discharging according to claim 7, wherein:

in the charging mode, the fourth switch K4 makes contact;

in the contravariant mode, the fourth switch K4 makes contact at the time of discharging to the out-vehicle electric circuit, a mobile make-contact head and a static contact head of the fifth switch K5 make contact at the time of discharging to the in-vehicle electric circuit; the fourth switch K4 makes contact, and the mobile make-contact head and static contact head of the fifth switch K5 make contact at the time of concurrently discharging to the out-vehicle electric circuit and the in-vehicle electric circuit;

in the AC/AC mode, the fourth switch K4 makes contact, and the mobile make-contact head and static contact head of the fifth switch K5 make contact.

9. A method for controlling an on-board OBC control circuit capable of bidirectionally charging and discharging, comprising: using the on-board OBC control circuit capable of bidirectionally charging and discharging according to claim 1, which operates in a charge mode, in a contravariant mode and in the AC/AC mode; and controlling the control switch module to correspondingly act according to a selected mode, so as to form a route for electricity transmission; wherein in the charge mode, the out-vehicle electric circuit charges the bidirectional on-board OBC through the switch module; in the contravariant mode, the bidirectional on-board OBC discharges the out-vehicle electric circuit and/or the in-vehicle electric circuit through the switch module; in the AC/AC mode, the out-vehicle electric circuit connects the in-vehicle electric circuit through the switch module.

10. The method for controlling an on-board OBC control circuit capable of bidirectionally charging and discharging according to claim 9, wherein:

in the charging mode, the first switch K1 makes contact, and the second switch K2 breaks contact;

in the contravariant mode, the first switch K1 makes contact at the time of discharging to the out-vehicle electric circuit, the second switch K2 makes contact at the time of discharging to the in-vehicle electric circuit; the first switch K1 and the second switch K2 make contact at the time of concurrently discharging to the out-vehicle electric circuit and the in-vehicle electric circuit;

in the AC/AC mode, the first switch K1 and the second switch K2 make contact.

\* \* \* \* \*